United States Patent [19]

Kay et al.

[11] Patent Number: 5,422,932
[45] Date of Patent: * Jun. 6, 1995

[54] CHANNEL COMPRESSION AND DYNAMIC REPATITIONING FOR DUAL MODE CELLULAR RADIO

[75] Inventors: Stanley Kay, Rockville; George D. Farmer, Frederick; Hans Bhatia, Germantown; Ashok D. Mehta, North Potomac; Christopher J. Kain, Damascus; Nick Sampson, Clarksburg, all of Md.

[73] Assignee: Hughes Aircraft Company, Los Angeles, Calif.

[*] Notice: The portion of the term of this patent subsequent to Aug. 30, 2011 has been disclaimed.

[21] Appl. No.: 238,042

[22] Filed: Apr. 25, 1994

Related U.S. Application Data

[63] Continuation-in-part of Ser. No. 870,976, Apr. 20, 1992, Pat. No. 5,343,513.

[51] Int. Cl.[6] .................. H04M 11/00; H01Q 7/22
[52] U.S. Cl. .................. 379/59; 455/33.1; 455/34.1; 370/95.1; 370/95.3
[58] Field of Search .................. 379/59, 58, 63; 455/33.1, 34.1, 54.1; 370/95.1, 95.3; 375/5, 7, 8

[56] References Cited

U.S. PATENT DOCUMENTS

| | | | |
|---|---|---|---|
| 4,870,696 | 9/1989 | Yorita | 379/59 |
| 4,949,395 | 8/1990 | Rydbeck | 370/95.3 |
| 5,107,494 | 4/1992 | Johnson et al. | 370/95.1 |
| 5,121,391 | 6/1992 | Paneth et al. | 370/95.1 |
| 5,128,928 | 7/1992 | Wilder et al. | 370/110.2 |
| 5,146,609 | 9/1992 | Taylor et al. | 455/54.2 |
| 5,150,361 | 9/1992 | Wieczoreck et al. | 370/95.1 |
| 5,157,661 | 10/1992 | Kanai et al. | 370/95.1 |
| 5,159,593 | 10/1992 | D'Amico et al. | 370/95.3 |
| 5,182,753 | 1/1993 | Dahlin et al. | 370/60 |
| 5,184,347 | 2/1993 | Farwell et al. | 370/75.1 |

*Primary Examiner*—Curtis Kuntz
*Assistant Examiner*—William Trost
*Attorney, Agent, or Firm*—Gordon R. Lindeen, III; Wanda K. Denson-Low

[57] ABSTRACT

A cellular system uses dynamic repartitioning and channel packing to improve capacity without impacting quality. Dynamic repartitioning is employed to convert a carrier which operates, at one time, as an analog carrier to operate, at a later time, as a digital carrier in response to changes in offered traffic. Alternatively, a carrier which, at one time, operates as a digital carrier is converted to operate, at a later time, as an analog carrier in response to changes in offered traffic. The system also supports multiple digital protocols so that a carrier can also be converted to operate in any one of several different digital modes. Channel packing is used to allocate as many digital channels as possible to as few digital carriers as possible. In a preferred embodiment, both repartitioning and channel packing are implemented in response to a request for a channel allocation or deallocation.

24 Claims, 9 Drawing Sheets

FIG. 4b

| | | | | | | |
|---|---|---|---|---|---|---|
| $f_i$ | $AV_1$ | | $AV_3$ | $AV_1$ | | $AV_2$ |

| | | | | | | |
|---|---|---|---|---|---|---|
| $f_j$ | | $AV_3$ | | | $AV_4$ | |

| | | | | | | |
|---|---|---|---|---|---|---|
| $f_k$ | $AV_5$ | $AV_6$ | | $AV_7$ | | $AV_8$ |

FIG. 5b

| | | | | | | |
|---|---|---|---|---|---|---|
| $f_i$ | $AV_1$ | $AV_3$ | $AV_2$ | $AV_1$ | $AV_4$ | $AV_2$ |

| | | | | | | |
|---|---|---|---|---|---|---|
| $f_j$ | | | | | | |

| | | | | | | |
|---|---|---|---|---|---|---|
| $f_k$ | $AV_5$ | $AV_6$ | | $AV_7$ | | $AV$ |

FIG. 4c

| $f_i$ | E | AV$_1$ |  | E | AV$_1$ |  |
|---|---|---|---|---|---|---|

| $f_j$ |  | E | AV$_2$ | E | E |  |
|---|---|---|---|---|---|---|

| $f_k$ | E | AV$_3$ | E |  |  | E |
|---|---|---|---|---|---|---|

FIG. 5c

| $f_i$ | E | AV$_1$ | AV$_2$ | E | AV$_1$ | AV$_3$ |
|---|---|---|---|---|---|---|

| $f_j$ |  | E |  | E | E |  |
|---|---|---|---|---|---|---|

| $f_k$ | E |  | E |  |  | E |
|---|---|---|---|---|---|---|

CHANNEL COMPRESSION AND DYNAMIC REPATITIONING FOR DUAL MODE CELLULAR RADIO

CROSS-REFERENCE TO RELATED APPLICATION

This application is a continuation-in-part of application Ser. No. 07/870,976 filed Apr. 20, 1992, now U.S. Pat. No. 5,343,513 by the applicants in this application and assigned to a common assignee.

BACKGROUND OF THE INVENTION

1. Field of the Invention

The present invention generally relates to improvements in dual mode cellular telephony and more particularly to a method and apparatus for repartitioning and compressing both digital and analog channels to maximize the capacity of the system without degrading the quality of the service.

2. Description of the Prior Art

The interim TIA standard IS-54 entitled "Cellular System Dual-Mode Mobile Station-Base Station Compatibility Standard" requires that the fixed component of the cellular telephone system be capable of handling mobile stations operating in an analog mode as well as mobile stations operating in a digital mode. The analog mode is at least similar to the Advanced Mobile Phone Service (AMPS) system which has been in operation in the United States for over 10 years. In the digital mode, Time Division Multiple Access (TDMA) is employed wherein, on a given carrier, time is segmented into frames and frames are further segmented into slots. A user may have exclusive use of one or more slots per frame. A voice channel is either two slots per frame (full rate coding) or one slot per frame (half rate coding). By this technique, several voice channels can occupy a given carrier. Since in the analog mode a carrier can only support one user at a time whereas in the digital mode a carrier can support three or six users at a time depending upon whether full rate or half-rate speech coding is used, the digital mode enjoys a traffic carrying advantage over the analog mode.

In order to comply with the IS-54 standard, a given base station will usually support carriers operating in any one of several modes. To more clearly describe the various communication modes, reference will hereinafter be made thereto as follows: a Type A communications mode designates a carrier operating in an analog mode, whereas Types B, C and D modes will designate carriers operating in digital TDMA modes, with Type B being a full rate coding of two slots per frame, Type C being a half rate coding of one slot per frame, and Type D being a higher capacity TDMA system using half rate speech compression, and digital speech interpolation (DSI). In the Type D mode, a channel is assigned only when the users are actually speaking. Such a system is more fully described in U.S. patent application Ser. No. 07/622,232 filed Dec. 6, 1990 and assigned to the assignee of the present application, the disclosure of which is hereby incorporated by reference fully herein. It should be understood that any combination of Types B, C or D communication modes may be used in this system without degrading the quality of service. A cellular base station needs access at any given time to some number of carriers to handle the traffic. It is desirable to maximize the system's capacity without degrading the quality of service. The factors impacting capacity and quality are the reuse factor, the propagation environment, the antennas, the distribution of mobile stations and the activity level of the channels. For a given reuse, propagation, antenna pattern and mobile station distribution, the Carrier to Interference Ratio (CIR) only depends on the activity level of the interfering carriers. Under these circumstances, if the parameters dictate failure to meet a CIR threshold, then the activity left with the carriers must be reduced until the performance goal is met.

The cellular model is idealized as a hexagonal grid with cell sites located at the center of each hexagon or at the vertices. Certain cells use the same frequency sets as other cells. This is called frequency reuse. In addition, cells may use directional antennas to limit interference, this is called sectorization. Popular configurations are seven cell, three sector and four cell, six sector. The capacity advantage achieved by frequency reuse is not without cost since it leads to co-channel interference. The CIR for a mobile station is found by computing the ratio of the desired signal power received by a mobile station to all of the co-channel interference received by that mobile station.

To the extent that a digital carrier supports a full complement of active voice channels, the interference generated by that digital carrier is justified. However, the standard requires that if any channel on the digital carrier is active, then the digital carrier must exist not only for the active channel but for the remaining complement of vacant channels on that digital carrier. Consequently, the interference generated by that digital carrier during the portion of the frame in which no voice or data traffic is being transmitted is, at least in some senses, unnecessary.

These particular factors raise at least two problems. A first problem is the appropriate mix of analog and digital carriers to be employed. While the IS-54 dual mode standard provides some flexibility in that a dual mode mobile station can operate either with an analog carrier or with a digital carrier, mobile stations that operate in only the analog mode should receive service to the extent that there are any available channels. If some a priori partitioning between analog and digital channels leaves some unused digital channels, then an analog mobile station may be denied service even though some channels are not being used, because that bandwidth has, a priori, been dedicated to the digital mode.

A second problem relates to the distribution of digital traffic on the digital carriers. Because the carrier can support multiple channels, and because the time at which a channel becomes vacant or inactive cannot be predicted, it is certainly conceivable that there will be multiple digital channels each operating at less than capacity. For example, if three digital carriers each operate at two-thirds of capacity, then there is the equivalent of a full digital carrier operating vacant. That condition generates unnecessary interference.

SUMMARY OF THE INVENTION

The present invention employs dynamic repartitioning of the available spectrum space as well as channel compression. This helps to minimize system interference and improve voice quality in an RF system in part by compressing the number of active channels within the available carriers.

In accordance with the invention, at least some of the spectrum allocated to a cell site is subdivided into a pool of carriers operating as analog carriers and at least two separate pools of carriers operating as digital carriers of at least two correspondingly different types. Call originations requiring an analog carrier are initially satisfied from carriers available in the pool of analog carriers. Likewise, call originations which are capable of employing a certain type of digital carrier are initially directed to the appropriate pool of digital carriers for support. In order to avoid the problems raised by a priori determination of analog and digital partitioning, the invention allows for changing the character of a particular carrier from digital to analog or analog to digital or from one type of digital to another in response to real time demands of the traffic. Furthermore, the distribution of digital traffic on the digital carriers is examined and that distribution is altered so that the channels can be repacked in order to minimize the number of vacant digital channels which exist on operating or active carriers.

Channel packing or compression implies that a connection will be moved from one channel to another. This operation takes place in conventional cellular telephony when a mobile station is moving from the coverage of one cell to another; i.e., in a handoff. However, in accordance with the present invention, the connection can be moved from one channel to another even though the mobile station has not moved from one cell to another. This will be herein referred to as intracell handoff. Intracell handoffs can be used:

to assure that the minimum number of RF channels are being used at call origination times or channel allocation request times so that the dynamic mode switching can work as well as possible;

to minimize system interference by assuring that the minimum number of RF channels are being used at any one time; and to minimize the voice quality impairments caused by handoffs.

To achieve the first and second goals, digital channels are preferably packed at every digital call termination or channel deallocation. This procedure precludes ever having to pack channels at call origination time when less time may be available. The third goal of minimizing voice quality impairments caused by handoffs, is, of course, best satisfied by never making intracell handoffs. Since the third goal is to some extent competitive with the first and second goals, we observe that intracell handoffs can be made to affect very few speech frames, particularly when the digital carriers in a cell are synchronized with each other (mutually synchronized).

An intracell handoff is accomplished by telling the mobile station to tune to a different channel, which may or may not be on a different carrier frequency. In the forward direction, the speech information is sent to both the old and new channels so the exact time at which the mobile station retunes does not affect the speech quality it receives; i.e., the base does not need to know exactly when the mobile station retunes. In the reverse direction the base station recognizes that the mobile station is tuned to the new frequency when the mobile station's transmission is detected on the new channel. At that time, the base station begins providing voice data to the Mobile Switching Center (MSC) from the new channel and ceases to provide it from the old. This entire process can be accomplished between time slots used by the mobile station. The process may result in the loss of one speech burst, but this can be masked by repeating the previous speech burst. The process will be virtually unnoticed by the mobile station user. Consequently, the intracell handoff can be performed as often as desired to control frequency interference and to maximize capacity.

The preceding description has assumed that the mobile station can switch from one RF channel to another in the time it takes to retune its frequency synthesizer and within the time required to receive only one speech burst. This is predicated on the assumption that the TDMA frames on every carrier are mutually synchronized. If this is not the case, then some additional time may be needed for the synchronization process.

In the Type D mode, a channel is only assigned for the duration of a speech spurt and not for the duration of a conversation. Consequently, an intracell handoff can occur without impairing voice quality when no speech is active in either direction. A voice activity detection, in the Type D mode, identifies when speech is active on the voice channels and thus an intracell handoff can be coordinated with this information; in other words, the intracell handoff occurs when the mobile station is either not transmitting or not receiving voice traffic.

Accordingly, the invention provides a method of operating a given cell in a cellular telephone system to improve capacity and reduce interference. In one embodiment the invention encompasses a method of operating a given cell of a cellular telephone system including the following steps:

In accordance with the invention, each of the digital carriers which supports at least a single channel does so by means of a time multiplexed frame structure in which each channel appears as at least one time slot within each frame, where the time slots of a given channel are distinct from the time slots of other channels of that digital carrier. In this environment, the frame structure of each of the digital carriers is synchronized so that a channel of one digital carrier is synchronous with the channel of some other digital carrier. By this technique then, the intracell handoff does not require resynchronization inasmuch as all the channels are synchronized.

In another embodiment, the invention provides a method of operating a given cell of a cellular telephone system to improve capacity and reduce interference which comprises the steps of:

a) assigning a set of radio frequency carriers to the cell;

b) dynamically varying an operating protocol of at least one of the radio frequency carriers, in response to traffic variations, between a first type of digital protocol that supports more than one channel per carrier and a second type digital protocol that supports more than one channel per carrier so that at one time said at least one radio frequency carrier operates as a first type of digital carrier and at another time said at least one radio frequency carrier operates as a second type of digital carrier;

c) examining those radio frequency carriers operating as digital carriers to locate carriers supporting a number of channels less than a maximum number of channels supportable on the digital carrier; and d) moving at least one operating connection from a channel of one digital carrier to a previously vacant channel of another digital carrier.

The same advantage of synchronizing the digital carriers to facilitate intracell handoffs is also an advantage in accordance with this aspect of the invention.

BRIEF DESCRIPTION OF THE DRAWINGS

The foregoing and other objects, aspects and advantages will be better understood from the following detailed description of a preferred embodiment of the invention with reference to the drawings, in which:

FIGS. 4(a) and 5(a) are time line diagrams showing variations in a use of digital channels at two different times;

FIGS. 4(b) and 5(b) are time line diagrams showing variations in the channel usage of dual use channels, before and after packing the channels, when both analog and digital traffic are present;

FIGS. 4(c) and 5(c) are time line diagrams showing variations in channel usage, at two different times, when Type B or C mode channels share frequencies with Type D mode channels;

DETAILED DESCRIPTION OF A PREFERRED EMBODIMENT OF THE INVENTION

Figure 1:
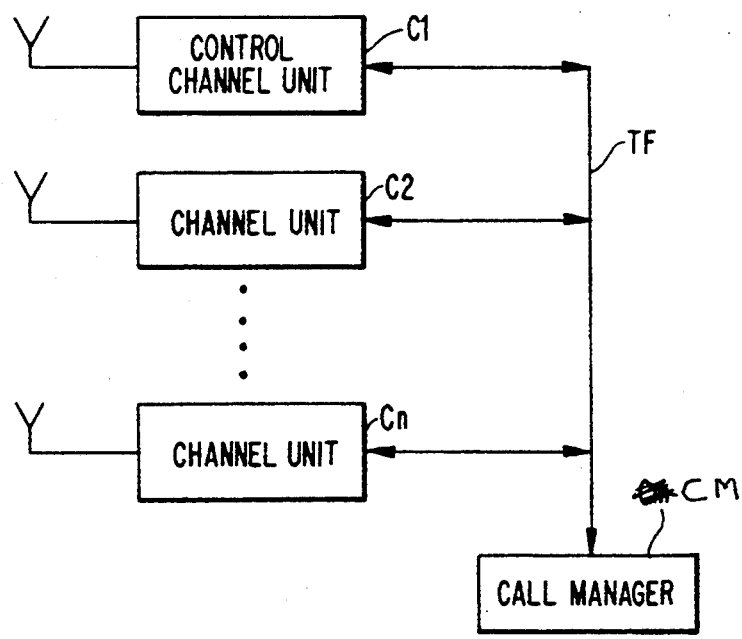
FIG. 1 is a block diagram of the components of a base station and an associated controller.

Referring now to the drawings, and more particularly to FIG. 1, several elements of a typical base station in a cellular radio communications network covering a cell or a portion of a cell are shown. More particularly, the base station includes several channel units such as the control channel unit C1, and the traffic channel units C2 through Cn. It should be apparent that the number of channel units will depend on the expected maximum traffic for the cell or the portion of the cell to be controlled. Receive and transmit radio frequency and energy on channels is allocated by the call manager CM which also dictates the operating mode of the channels whether digital or analog. Each channel unit can operate either as a control channel unit or a traffic channel unit. As a control unit, the channel unit can either transmit or receive FSK (frequency shift keyed) call control data. Voice traffic is processed by the channel units which are not operating as control channel units, such as the channel units C2 through Cn illustrated in FIG. 1. Depending on control signals received from the call manager CM, the traffic channel units can transmit frequency modulated (FM) voice traffic to a mobile station (analog carrier). Traffic channel units can also receive frequency modulated voice traffic from a mobile station (analog carrier). Other traffic channel units can transmit voice information on a time multiplexed digital channel to a mobile station (digital carrier) and receive time multiplexed digital voice information from a mobile station (digital carrier).

Figure 2:
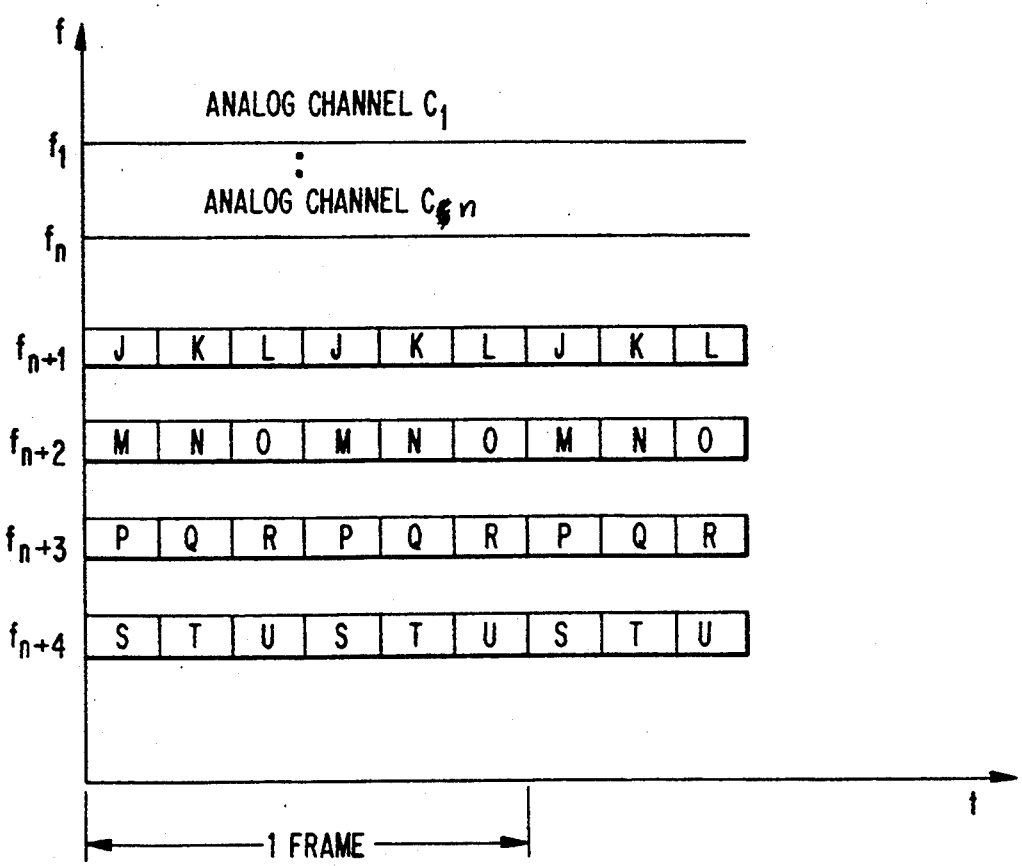
FIGS. 2 and 3 are time line diagrams of voice traffic distributions within the spectrum space available at a particular base station.

FIG. 2 illustrates a distribution of channels (either control or voice traffic) at a base station. FIG. 2 shows a plurality of carriers $f_l$ through $f_{n+4}$ (on the vertical axis) against time (on the horizontal axis). As shown in FIG. 2, the base station operates a plurality of analog channels $C_l$ through $C_n$. Inasmuch as the analog channels are not time multiplexed, there is only a single channel per carrier. FIG. 2 also shows a complement ($f_{n+1}$ through $f_{n+4}$) of digital carriers. The digital carriers however are time multiplexed and in the example shown in FIG. 2 there are three channels per carrier as for the full rate coding of IS-54 (Type B, above). Each channel comprises two of the six time slots in the repeating TDMA frame. A half-rate mode channel (Types C and D) requires only one of the six slots in a frame. The frames repeat as shown in FIG. 2 and as is well known in the art. As shown in FIG. 2, channels J, K and L are all supported by the digital carrier $f_{n+1}$. Likewise, another carrier supports channels M, N and O, still another carrier supports channels P, Q and R and a further carrier supports channels S, T and U.

Figure 3:
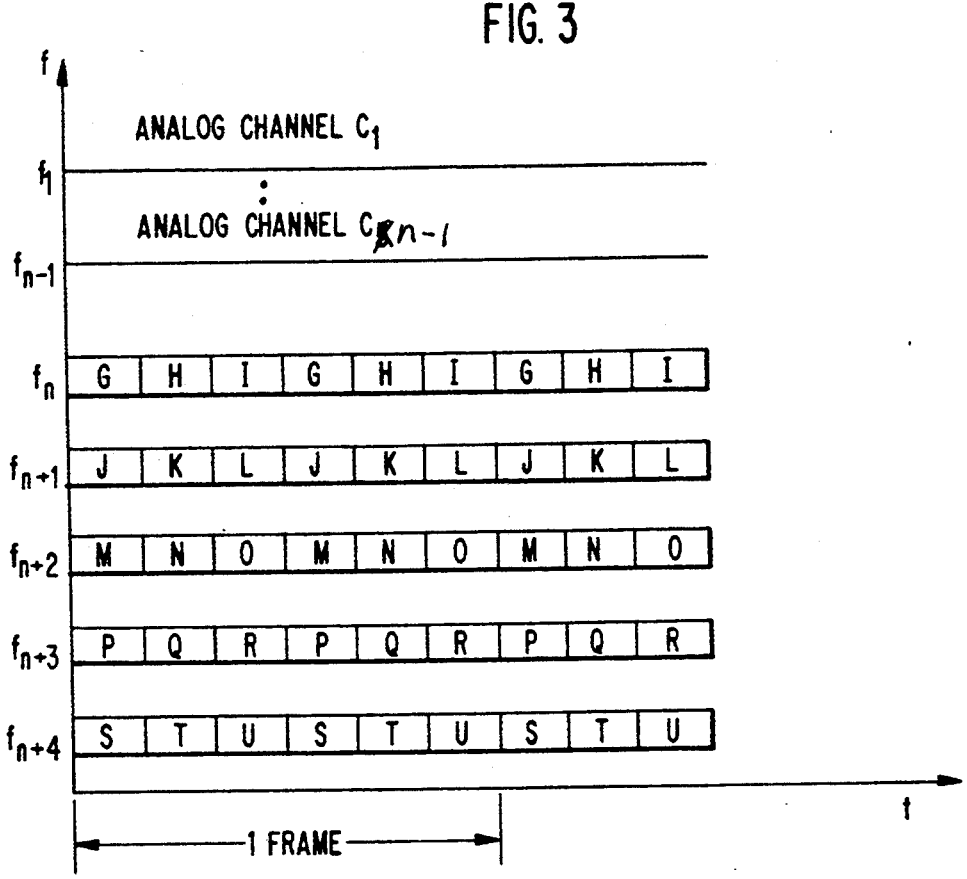

FIG. 3 is an illustration similar to FIG. 2 for the same base station, illustrating the dynamic repartitioning of the frequency spectrum available to the station. As shown in FIG. 3, analog channels $C_l$ through $C_{n-1}$, are supported, i.e. analog channel $C_n$ is no longer present. In addition, whereas FIG. 2 showed four digital carriers supporting twelve digital channels, FIG. 3 shows five digital carriers supporting 15 digital channels; i.e., digital channels G, H and I are shown in FIG. 3 whereas those channels are used to support a single analog channel in FIG. 2. The digital channels need not carry exclusively full rate voice as shown in FIGS. 2 and 3, but may carry any mix of Type B (full rate), Type C (half rate) or Type D (half rate with DSI) voice or data.

It is a feature of the IS-54 standard that while a digital carrier can support three channels, the carrier must be on continuously even if only a single channel is active. In other words, of the 15 digital channels G-U shown in FIG. 3, not all of the channels are necessarily active, in fact, if any one of the three digital channels is active, the carrier must be present throughout the frame. This leads to the possibility that as time progresses, and because of call terminations or pauses in voice communications, for example, a digital carrier may be supporting less than its full complement of channels. Furthermore, if there are multiple digital channels supporting less than their full complement of channels, there may be an opportunity for packing the digital channels so as to deactivate or turn off one or more of the digital carriers.

Figure 4A:
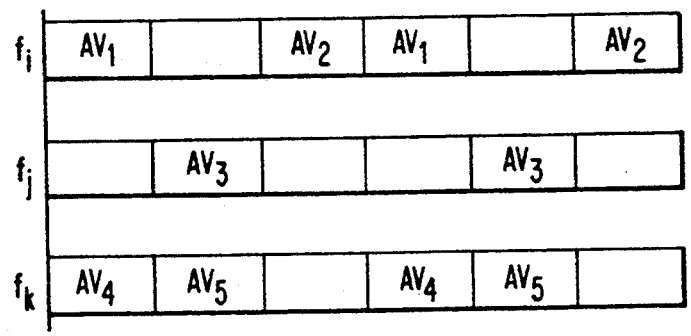

FIGS. 4(a) and 5(a) show three digital carriers $f_i$, $f_j$ and $f_k$ and rather than merely identifying each of the different channels, only active channels are identified. Each connection between a mobile station and another station (whether it is mobile or not) requires (at least at some time) a forward and a reverse channel. Each active channel, such as $AV_1$ represents one such channel; i.e., either a forward or a reverse channel. Thus, as shown in FIG. 4(a), the carrier $f_i$ supports two active channels $AV_1$ and $AV_2$. The digital carrier $f_j$ supports a single digital channel $AV_3$ and digital carrier $f_k$ supports two further active channels, $AV_4$ and $AV_5$. Carriers $f_i$, $f_j$ and $f_k$ each are theoretically capable of supporting three channels but, at the time shown in FIG. 4(a), call terminations have left a free channel in the carriers $f_i$ and $f_k$ and two free channels on carrier $f_j$. As has been mentioned previously, the presence of an active carrier causes adjacent and co-channel interference. To the extent that the carrier is supporting traffic on a full complement of channels, that interference is unavoidable. To the extent, however, that the carrier is not carrying traffic to its capacity, the interference may be unnecessary. FIG. 5(a) shows the portion of the frequency spectrum at the base station illustrated in FIG. 4(a), wherein now the channel $AV_3$ has been moved from one carrier $f_j$ to the different carrier $f_i$. It should be apparent from FIG. 5(a) that an opportunity is now present to deactivate the carrier $f_j$ and thus eliminate any interference it may cause. This illustrates an advantage of channel packing. FIGS. 4(a) and 5(a) also show that in a preferred embodiment, the complement of digital carriers at a cell site are synchronized; i.e., there are channels on one carrier which are synchronous with channels on another carrier. This relationship may be implemented by deriving the timing for both of the carriers from a common source. As described, the synchronization of carriers simplifies the intracell handoff which is associated with channel packing.

Channel packing may be applied to any mix of Type A, B, C or D mode voice channels or with data packets. For half rate channel packing (Type C), the principle is identical to that of full rate, (Type B); i.e., reduce the amount of generated interference by reducing the number of active carriers.

In prior art cellular telephony, a transfer of a connection from one carrier to another typically occurs at a handoff from one cell or cell region to another cell or cell region. In this case, however, the handoff implied from the transition from FIG. 4(a) to FIG. 5(a) is intracell or intracell region. In other words the connection has been moved from one carrier to another carrier even though both carriers are within the complement of the equipment supporting the traffic in a single cell or cell region. It should also be apparent from FIG. 5(a) that now the digital carrier $f_j$ is not carrying any traffic at all. This carrier can, in full compliance with IS-54, be turned off. This leads to a reduction in co-channel and adjacent-channel interference which otherwise would have been caused by the RF energy represented by the carrier $f_j$.

The transition from FIG. 4(a) to FIG. 5(a) can be performed at any time that $AV_1$ through $AV_5$ require a channel. The criteria for performing possible intracell handoffs to achieve such a transition may depend on any one or more of many different tests. A timer, a measure of interference, a measure of channel capacity, the beginning or end of a channel assignment demand or a measure of channel packing efficiency can be used to determine when intracell handoffs should be considered.

It should be apparent that the transition from the channel distribution of FIG. 2 to that of FIG. 3 and the transition from the channel frequency distribution of FIG. 4(a) to that of FIG. 5(a) will be dictated by the changing mix of offered voice traffic. In other words, if the analog channels $C_i$-$C_n$ continue to be occupied by voice traffic, then the base station can not make the transition from the situation of FIG. 2 to that of FIG. 3 without terminating a call in progress on analog channel $C_n$. However, if the carrier supporting analog channel $C_n$ were not in use, and additional digital voice traffic is offered to the base station, then the transition from FIG. 2 to FIG. 3 will allow the base station to support the offered digital traffic. Inasmuch as FIGS. 4(a) and 5(a) distinguish active channels from inactive channels, handing off $AV_3$ from one carrier to another provides the advantage of freeing the carrier $f_j$.

Figure 5B:
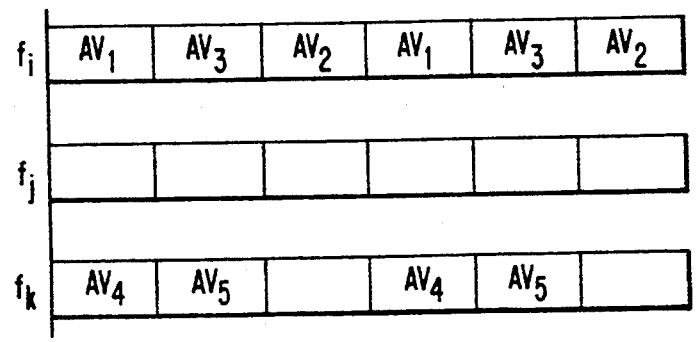

Looking now at FIGS. 4(b) and 5(b) one sees that $f_j$ carries two Type C, half rate voice channels ($AV_3$, $AV_4$). Carrier $f_i$ has two empty slots in the frame so that the two Type C channels ($AV_3$, $AV_4$) can be packed into the empty slots in $f_i$, as shown in FIG. 5(a). This frees carrier $f_j$, thus allowing it to be turned off to reduce the interference generated by the unused channels. The other slots maintain their assignments to Type B mode usage.

FIGS. 4(c) and 5(c) show a typical scheme for increasing the quality of voice communications when full and half-rate channels (Types B and C, respectively) share frequencies with Type D channels, labeled E, which are assigned channels only during each brief spurt of speech and not for an entire conversation. The Type D channels are only active in the slots which have active voice. Packing the channels does not reduce interference or improve communications quality with Type D alone, but when Type B and C channels share frequencies with Type D, the Type B and C channels should be packed onto as few carriers as possible, as illustrated in FIGS. 4(c) and 5(c). Note that in FIG. 4(c), Type C channel $AV_2$ on carrier $f_j$ and Type C channel $AV_3$ on carrier $f_k$ can be packed onto carrier $f_i$, as shown in FIG. 5(c) to significantly improve the quality of transmission and simultaneously provide more flexibility on carriers $f_j$ and $f_k$ for the Type D communications.

Figure 6:
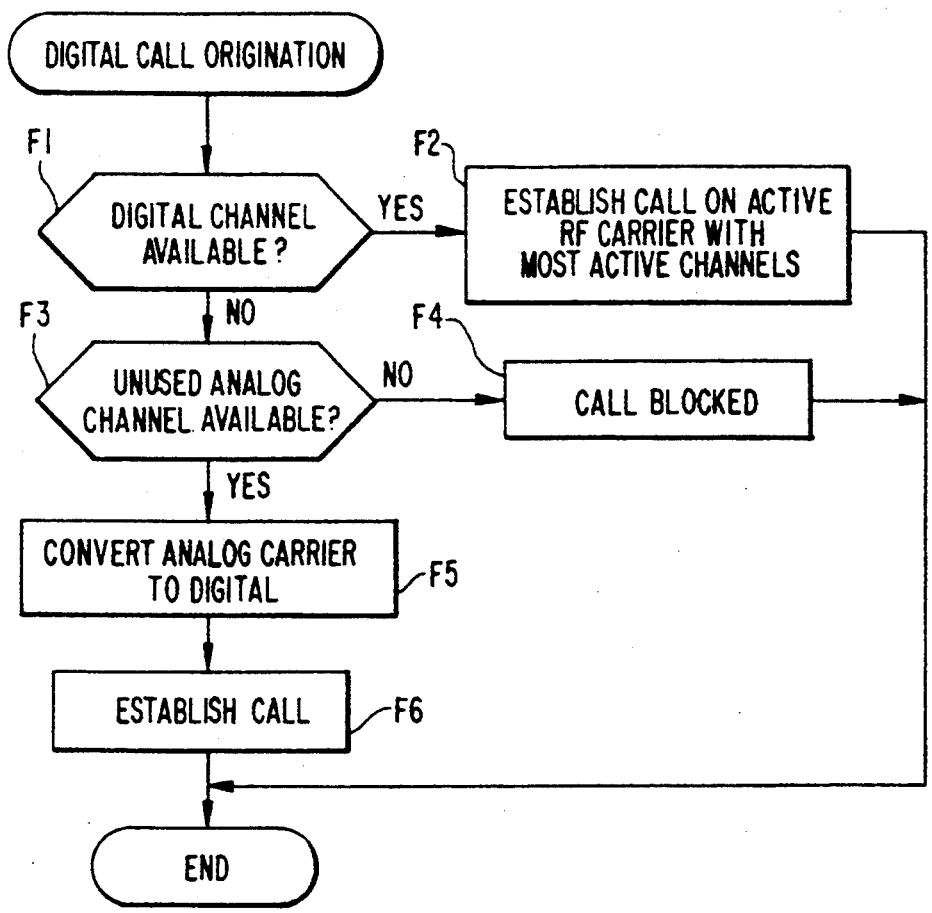
FIGS. 6 to 10 are flow diagrams illustrating the processing which is employed in accordance with one embodiment of the invention to achieve the advantages thereof.
Figure 7:
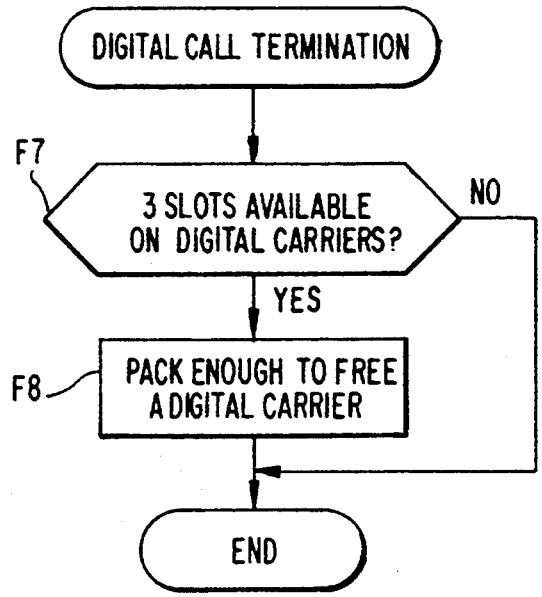
Figure 8:
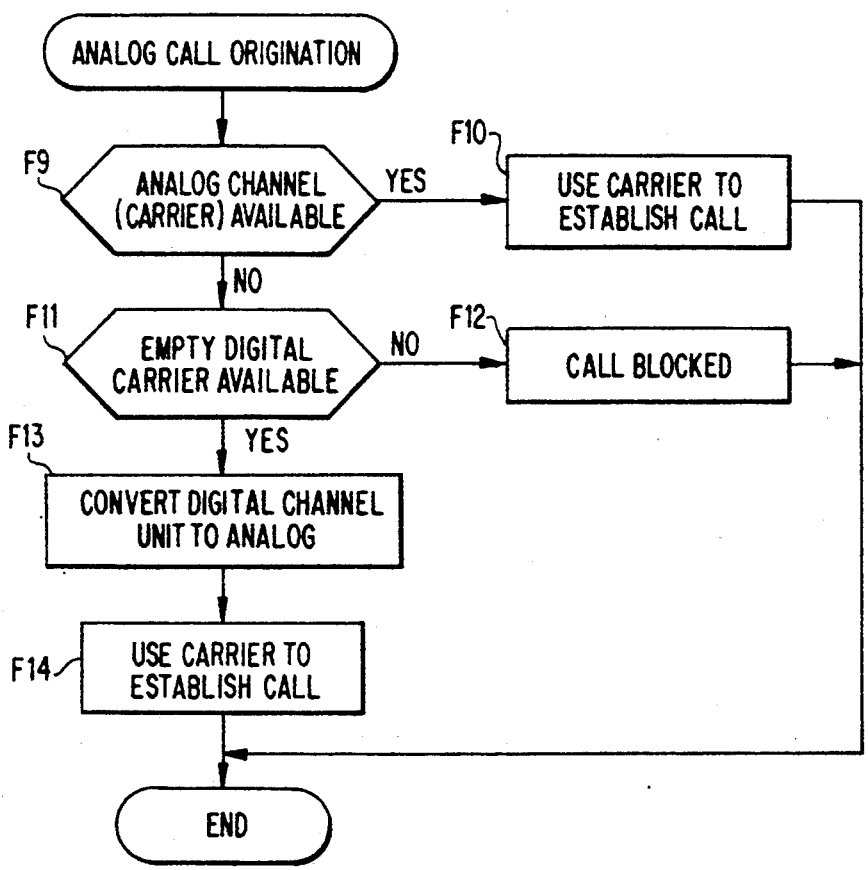

There are many procedures which can be implemented in order to obtain the advantages in dynamically allocating voice channels to the frequency spectrum available at the base station. One set of procedures which can be employed is illustrated in FIGS. 6 to 8. Preferably, these procedures are triggered by the beginning or end of a channel assignment demand, either call originations or terminations; i.e., changes in the offered traffic at the base station.

FIG. 6 illustrates a procedure implemented at call origination by a mobile station which is capable of interacting with a digital carrier. If the attempted call origination is commenced by the mobile station, the information transmitted by the mobile station during the setup process identifies the digital capabilities, if any, of the mobile station. For other calls, i.e., where the mobile station is the call termination, the mobile station identification reveals this same information. In any event, when a call attempt is received at the base station and it has been identified as potentially for a digital call, function F1 is performed to determine whether or not any digital channels are available. Referring for example to FIG. 4(a), it is apparent that there are digital channels available on the carriers $f_i$, $f_j$ and $f_k$. In that circumstance, function F2 is performed to establish the call on an active RF carrier with the most active channels. In other words, an attempt is made by the function F2 to "fill up" the complement of channels supported by a carrier. Thus, under these circumstances either the carriers $f_i$ or $f_k$ would be favored over setting up the call in the carrier $f_j$.

On the other hand, if function F1 identified no available digital channels, then function F3 is performed to determine whether there are any unused analog channels available. If not, function F4 is performed, i.e. the call is blocked. Under those circumstances, processing would be terminated with function F4.

If there is an unused analog channel available, function F5 is performed to convert that analog channel to a digital channel. Execution of function F5 merely requires transmitting the appropriate control signals to an available channel unit directing it to operate the carrier as a digital carrier, i.e. in a digital format. For example, the channel unit which previously supported $C_6$ (FIG. 2) can be commanded to change its operating mode from analog (FIG. 2) to digital (FIG. 3). The control information to the channel unit would, in that event, of course also identify a particular one of the channels on the carrier for use by the offered call. Thereafter, function F6 would establish the call on the carrier which had been converted from an analog carrier to a digital carrier. The processing shown in FIG. 6 then is the processing that would be employed if, for example, analog channel $C_6$ (FIG. 2) were unoccupied and none of the channels J through U were available.

The processing shown in FIG. 7 is implemented in the event of a digital call terminations in the preferred embodiment. Alternatively, F7 and F8 might be implemented at an analog or digital call origination if sufficient carriers were available. Function F7 determines whether, among the complement of digital carriers, there are three available channels on digital carriers. If there are not, among the complement of carriers supported by the base station, three available channels, then there is no point to repacking the digital channels. However, if there are three channels which are open among the complement of digital carriers, then function F8 is performed to pack enough of the digital channels to free up a digital carrier, in other words, to execute the appropriate number of intracell handoffs to free up an entire digital carrier. In this case, FIGS. 4(a) and 5(a) illustrate execution of function F8. In other words, among the three digital carriers shown in FIG. 4(a), there are four available channels. FIG. 5(a) shows the situation after execution of function F8, that is, when $AV_3$ has been handed off from the carrier $f_j$ to the carrier $f_i$ to free up the carrier $f_j$.

Type D mode calls are, as explained above, assigned a channel only for the duration of a speech spurt. Accordingly, when the speech spurt ends, the channel is deallocated even though the call has not been terminated. The procedure of FIG. 7, however, can be used upon the end of a speech spun for Type D channels as well in the same way it is applied to Type B and C channels on call termination.

FIG. 8 shows the processing implemented on the origination of an analog connection. As was the case for FIG. 6, whether the call is mobile station originated or not, the information provided to the base station identifies whether or not the mobile station can interact with a digital carrier. If it cannot, then that information indicates an analog call origination and the processing shown in FIG. 8 is implemented. Function F9 determines whether there are any analog carriers available. If there are, function F10 is performed to use that carrier to establish the call. On the other hand, function F11 determines if there are any digital carriers available. If there are not, function F12 is performed, i.e. the call is blocked. If there are digital carriers available which are not in use, function F13 is performed to convert a digital channel unit to analog. Again, this merely requires transmitting the appropriate control signals to an available channel unit. Finally, function F14 is performed to use the now-convened analog carrier and to establish the call.

In some cases, there may be no free digital carrier available, however, the digital channels may be inefficiently packed as shown in FIGS. 4(a) and 4(b). In such a case, the digital channels can be repacked, as shown by the transition to FIGS. 5(a) and 5(b) to free a digital carrier. This newly available carrier can then be used in functions F13 and F14 to support the new analog call.

Another offered traffic event is the termination of an analog call. Under the example described herein, no processing related to the repartitioning and/or digital channel packing need be triggered by an analog call termination.

Figure 9:
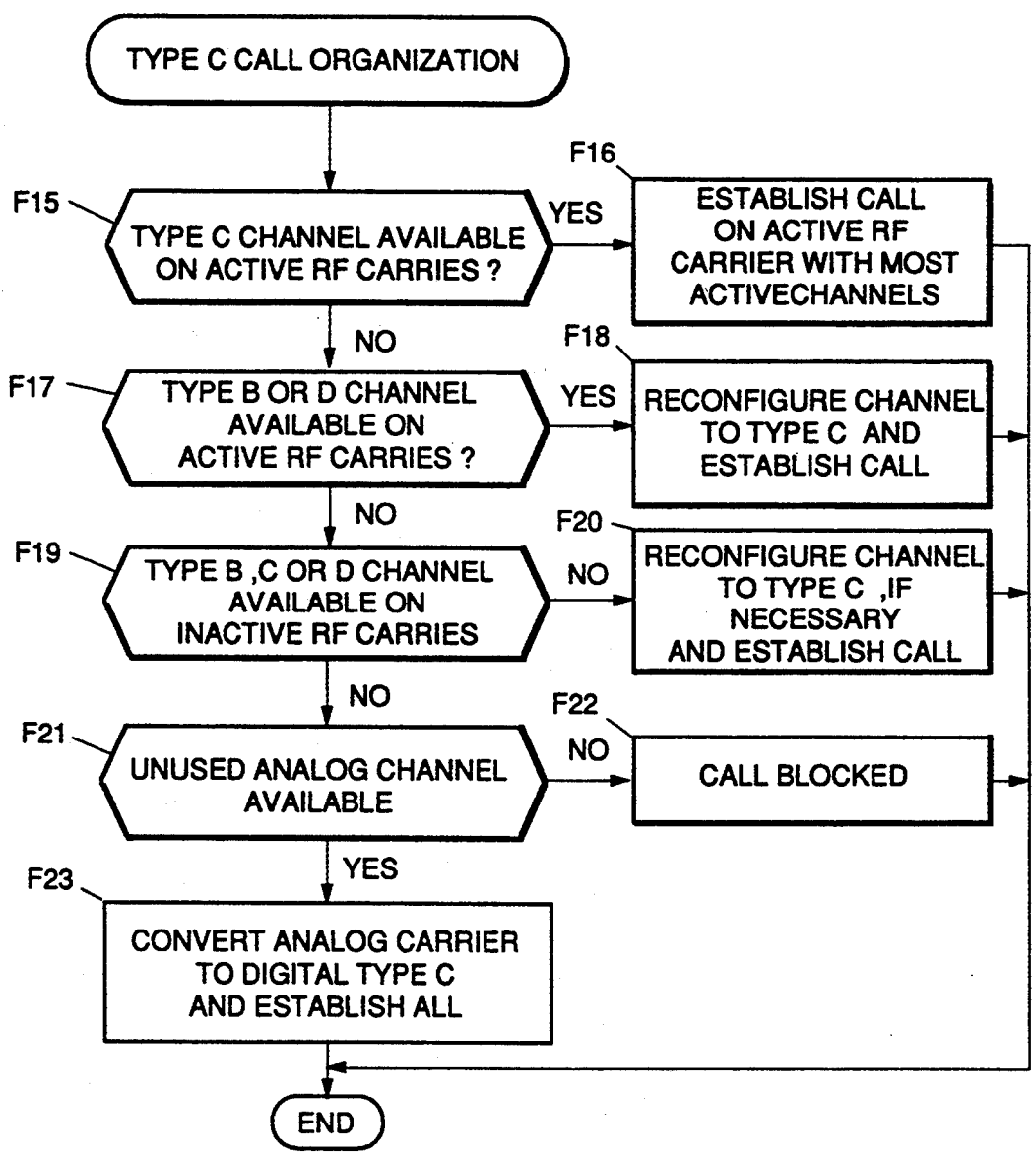
Figure 10:
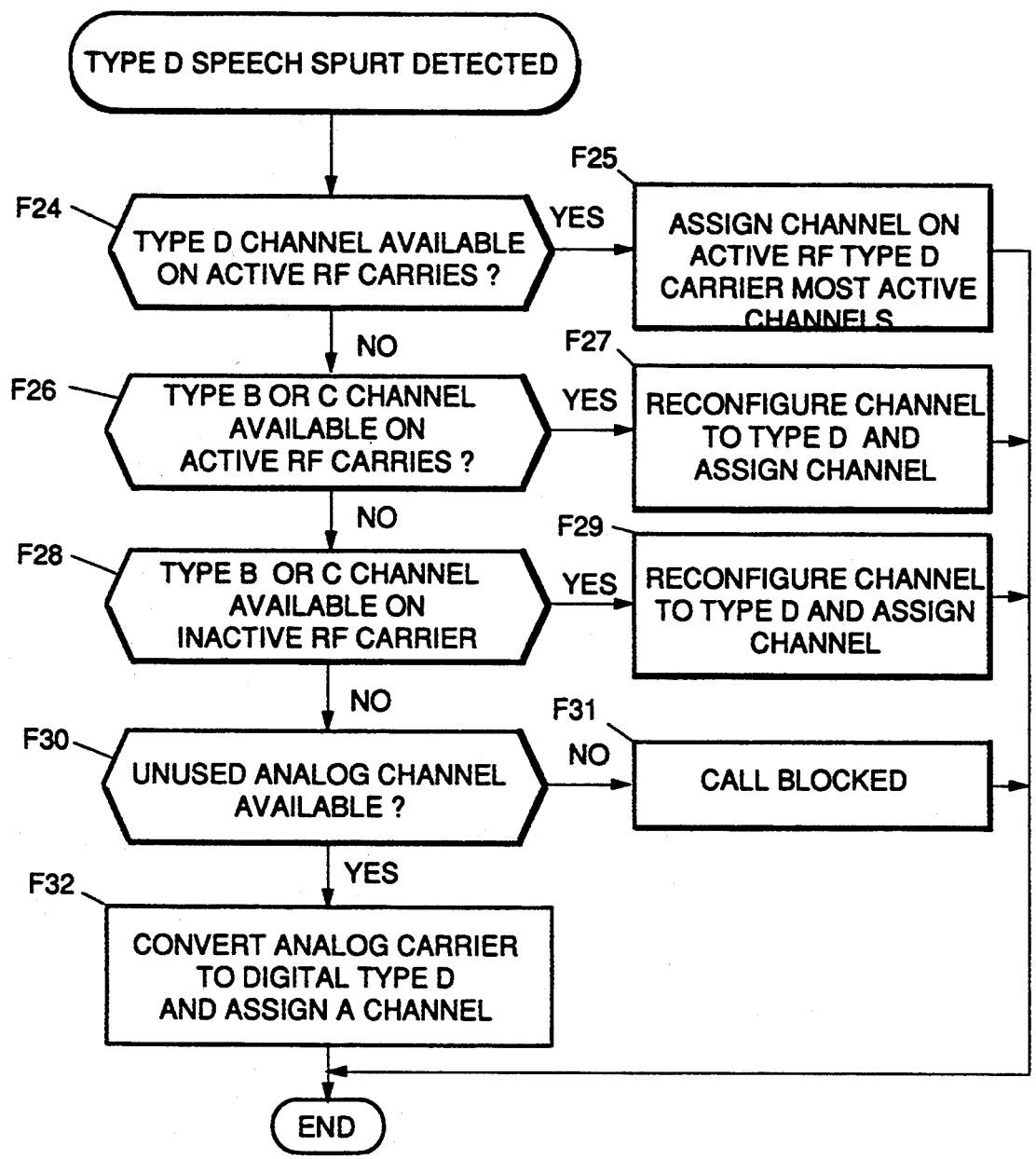

FIGS. 9 and 10 illustrate procedures which can be implemented at the origination of Type C and D calls, respectively. Those procedures handle further changes in the mix of traffic demands placed on the multiple-mode system. Referring to FIG. 9, the base station has determined, using the identification transmitted by the mobile station, that the mobile station can support Type C mode operation. Typically, such a mobile can also support Type B and Type A operation, however, because the Type C mode supports more users per carrier, it is generally preferred that Type C operation be selected when possible. Function F15 is performed to determine whether or not a Type C channel is available on any active RF carriers. FIGS. 4(a), 4(b), and 4(c) all show the availability of a single slot per frame on all three illustrated carriers. FIGS. 5(a), 5(b) and 5(c) also show a Type C channel as available on carrier $f_k$. However, the available digital channel may already be configured as Type B, C, or D. If the available channel is configured as Type C already then the call is established on the Type C channel in function F16 preferably selecting the carrier with the most active channels in order to optimize the channel packing density. If no active Type C channels are available on an active carrier, then a Type B or D channel is sought on an active carrier in function F17. If one is found, then the channel is reconfigured to a Type C channel and the call is established on the newly reconfigured channel. If no Type B, C or D Type channel can be found, then an inactive B, C or D Type channel is sought in function F19. The found channel is then assigned to an available channel unit, the channel unit is configured as Type C and then activated in function F20 and the call is established accordingly. If no digital channels can be found, then similarly to F3 of FIG. 6, an analog channel is sought, function F21, converted to, in this case, Type C digital, F23 and the call is established. If there is still no available channel, the call will be blocked in function F22.

The procedure for Type D calls as shown in FIG. 10 is very similar except that Type D channels are first sought rather than Type C. As mentioned above, both Type C and Type D channels require only one slot per TDMA frame so that the same slot availability will accommodate either mode. The primary difference between Type C and Type D operation is that Type D channels are assigned only so long as speech is detected at the transmitting side of the call. Accordingly, Type D calls are not assigned a channel to establish a call. The call is established if the system judges that capacity is available. A channel is first assigned when a spurt of speech is detected so that the speech spurt can be transmitted. When the speech spurt ends, the channel is deallocated and made available to other users. When the next speech spurt is detected, another channel is assigned. The next assignment could be to the same channel, if it is still vacant or a different channel.

The process begins with the registration of a call. The subscriber unit's location and identity are established together with a match to the appropriate line at the base station. Channel assignment begins when a speech spurt is detected at either end. First, a Type D channel is sought on an active carrier, F24. If one is found, then that channel is assigned for the detected speech spurt, F25. If no channel is found, then a Type B or C channel is sought on an active carrier, F26. If one is found, then the channel is reconfigured and the speech spurt is assigned to the newly reconfigured channel, F27. If no active digital carriers are available, then an inactive digital carrier is sought, F28. If an available digital carrier is found, then it is converted as appropriate and the speech spurt is assigned to that channel, F29. If no digital channels are available, then an analog channel is sought, F30, converted to Type D digital and used for the call F32. If no channels are available, then again, the call is blocked, F31.

Figure 11:
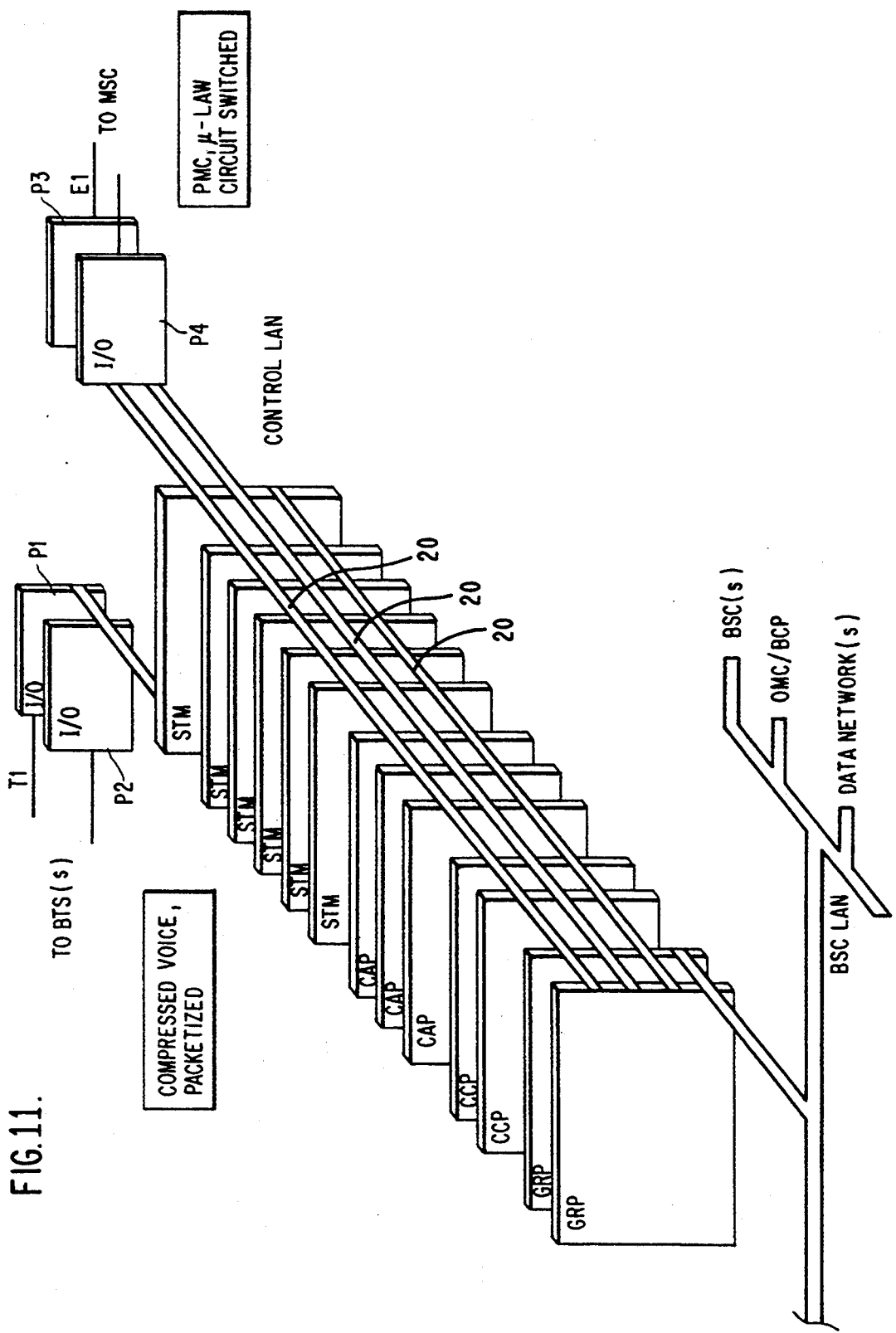
FIG. 11 is a block diagram of a preferred embodiment of a base station controller in accordance with a preferred embodiment of the invention.

FIG. 11 is a block diagram of a base switching control unit which can be employed to implement the present invention. The Base Switching Center (BSC) shown in FIG. 11 includes the call manager function CM shown in FIG. 1. The BSC of FIG. 11 includes I/O cards P1 and P2 supporting the T1 interfacility link TF which is shown in FIG. 1 for carrying traffic and control signals to channel units and traffic and control signals from the channel units. The BSC of FIG. 11 is also coupled through ports supported by the Input/Output (I/O) cards P3 and P4 to a Mobile Switching Center (MSC) which in turn is connected to the PSTN. As noted in FIG. 11, voice traffic traveling to and from the cards P1 and P2 is packetized compressed voice, whereas voice traffic traveling to and from the cards P3 and P4 is PCM, mu-law circuit switched, i.e. expanded voice traffic.

The BSC further includes a number of modules interconnected by the buses 20 shown in FIG. 11. These modules include a Switching Transcoder Module (STM), a Switching Interconnect Module (SIM), a Channel Access Processor (CAP), a Channel Control Processor (CCP) and a Global Resource Processor (GRP). The functions and components of these various modules (other than the SIM module), to the extent not connected with the spectrum repartitioning and digital channel packing described herein are described in applicant's co-pending application Ser. No. 07/622,232 filed Dec. 6, 1990, and assigned to the assignee of this application (the disclosure of which is incorporated herein by reference). This application is directed to the type of system referred to above as Type D. It should be emphasized that application of the present invention does not require the use of Type D communications, although the invention can be so implemented. The SIM is a unit which is described in the copending application Ser. No. 07/870,073 filed Apr. 17, 1992, and assigned to the assignee of this application. SIM is not related to the repartitioning and channel packing described herein.

Figure 12:
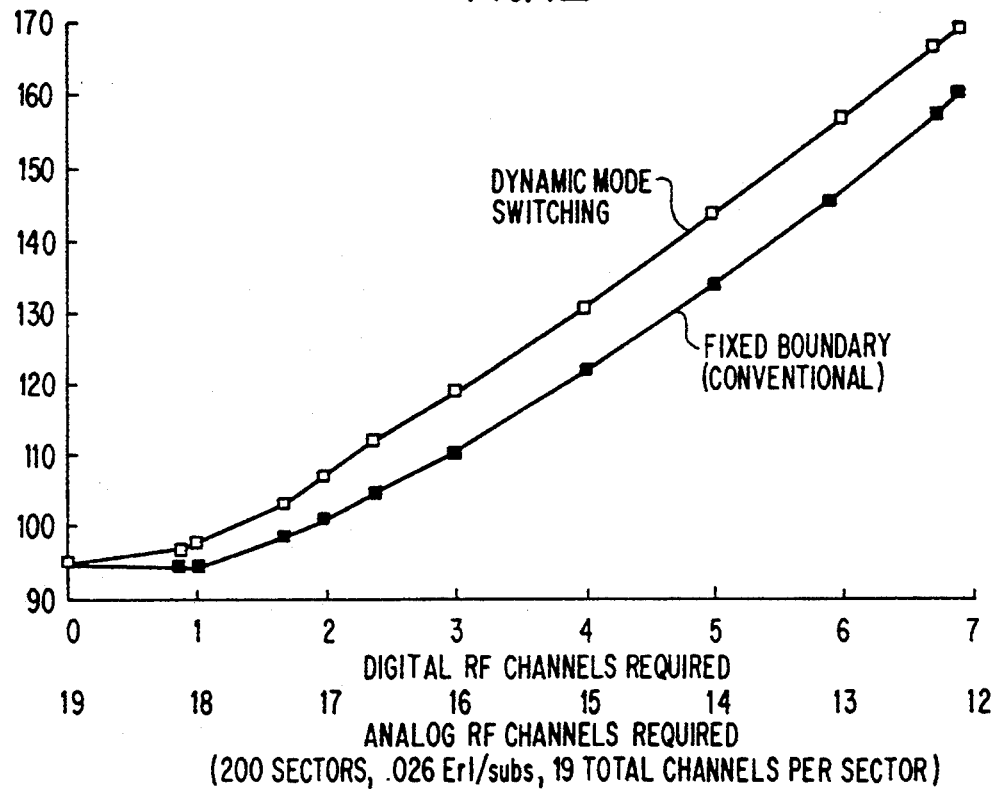
FIG. 12 is a graph with the channel configuration of a 200 sector system on the horizontal axis and the traffic capacity on the vertical axis to illustrate an advantage of the invention in increasing capacity by use of dynamic repartitioning of the frequency spectrum.

FIG. 12 is useful for explaining the increase in capacity provided by application of the dynamic repartitioning of spectrum capacity in accordance with the present invention. FIG. 12 shows capacity for a cellular telephone system employing 200 sectors where each sector is allocated nineteen channels. The nineteen channels allocated per sector can vary from nineteen analog channels (and zero digital channels) to perhaps eighteen digital channels and one analog channel, although FIG. 12 is only drawn to illustrate the variation from nineteen analog channels and zero digital channels to twelve analog channels and seven digital channels. The illustration of FIG. 10 is based on the requirement of carrying 0.026 Erlangs per subscriber and shows, under those circumstances that the number of subscribers that can be supported by different mixes of analog and digital is fixed. Of the two curves shown in FIG. 1, the lower curve (identified as fixed boundary—conventional) shows the capacity for different combinations of analog and digital channels. The upper curve illustrates the capacity for the same mix of channels which has the added feature of being capable of transferring channels between analog and digital. Those skilled in the art will recognize from reviewing FIG. 10 that the repartitioning of bandwidth in accordance with the present invention increases the capacity of the system without changing the number of channels and/or the spectrum which is occupied.

It should be apparent that many changes can be made within the spirit and scope of the invention. For example, some cellular operating techniques mandate the maintenance of a spare channel, either a digital channel or an analog channel in order to control blocking probabilities or call loss due to failed handoff. The processing of FIGS. 6–8 can easily be altered to encompass this characteristic. For example, rather than waiting until there are no unused channels available in either the analog or digital pool before converting, the processing could implement an attempt to convert if there is only a single unused channel (or some small number) available.

The channel modes identified as Types A, B, C and D can also be varied. Different TDMA slot and frame structures can be used with different types of speech compression. The principles can also be applied to other types of packetized multi-mode data communication systems. Packetized data in a half or full rate mode can also be incorporated into the preferred embodiment described above as a Type E mode applying the same principles described above. Such a Type E mode could, for example, transmit fax, modem, paging or messaging data.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of operating a given cell of a cellular telephone system comprising the steps of:
   at a first time, establishing for a set of n radio frequency carriers available within the given cell, a first subset $n(a1)$ of carriers operating as a first type of digital carriers supporting from 1 to y channels per carrier on a time multiplexed basis and a second subset $n(d1)$ of carriers operating as a second type of digital carriers supporting from 1 to x channels per carrier on a time multiplexed basis, where
   $n(a\#)$ represents a number of digital carriers of the first type at a time identified by the index $\#$,
   $n(d\#)$ represents a number of digital carriers of the second type at a time identified by the index $\#$,
   n represents a number of carriers at the cell,
   n, $n(a\#)$ and $n(d\#)$ are each integers, a sum of n(a#) and n(d#) is less than or equal to n, and x and y are integers greater than or equal to two;

b) at a second time later than said first time,
   b1) examining each of the second type digital carriers to locate those supporting less than x channels;
   b2) selecting channels from among a group of the second type of digital carriers located in step b1 and rearranging the selected channels to occupy unused channels of second type digital carriers located in step b1 which are not within the digital carrier group, rearranging at least some of the channels on the located carriers to occupy unused channels on other located carriers; and c) at a third time, later than the first time, selecting at least one second type digital carrier supporting no channels and removing said selected second type digital carrier from the second subset of carriers operating as second type digital carriers and inserting the removed carrier into the first subset of carriers operating as first type digital carriers so that the first subset of carriers at the third time n(a3) is greater than the first subset of carriers n(a1) at the first time.

2. A method as recited in claim 1 in which the second time is at termination of a digital call corresponding to the second type of digital carrier and the third time occurs at origination of a digital call corresponding to the first type of digital carrier.

3. A method as recited in claim 1 in which the second time is at termination of a digital call corresponding to the first type of digital carrier, and the third time occurs at origination of a different digital call corresponding to the first type of digital carrier.

4. A method as recited in claim 1 which includes the further steps of:
   d) for each of the second type digital carriers which supports at least a single channel, creating a repeating frame structure in which each channel appears as at least one time slot within each frame, with any time slot of a channel distinct from time slots of other channels of that digital carrier; and
   e) synchronizing the frame structure of each of the digital carriers so that a channel of one digital carrier is synchronous with a channel of some other digital carrier.

5. A method as recited in claim 1, wherein one of either the first type or the second type of digital carrier supports twice as many channels per carrier on a time multiplexed basis as the other of either the first or second type of digital carrier.

6. A method as recited in claim 1, wherein the second time is at the end of a speech spurt and the third time is at the beginning of a speech spurt.

7. A method of operating a given cell of a cellular telephone system comprising the steps of:
   assigning a set of radio frequency carriers to the cell;
   dynamically varying an operating protocol of at least one of the radio frequency carriers, in response to traffic variations, between a first type of digital protocol that supports more than one channel per carrier, and a second type digital protocol that supports more than one channel per carrier so that at one time said at least one radio frequency carrier operates as a first type of digital carrier and at another time said at least one radio frequency carrier operates as a second type of digital carrier;
   examining those radio frequency carriers operating as digital carriers to locate carriers supporting a number of channels less than a maximum number of channels supportable on the digital carrier; and
   moving at least one operating connection from a channel of one digital carrier to a previously vacant channel of another digital carrier.

8. A method as recited in claim 7, wherein the steps of examining and moving occur at termination of a digital call corresponding to the second type of digital carrier and the step of dynamically varying an operating protocol transfers a digital carrier of the first type to a digital carrier of the second type at origination of a digital call corresponding to the second type of digital carrier.

9. A method as recited in claim 7, wherein the steps of examining and moving occur at termination of a digital call corresponding to the second type of digital carrier and the step of dynamically varying an operating protocol transfers a digital carrier of the first type to a digital carrier of the second type at detection of speech to be transmitted using the second type of digital protocol.

10. A method as recited in claim 7, wherein the steps of examination and moving occur at termination of a speech spun and a channel corresponding to the second type digital protocol and wherein the step of dynamically varying an operating protocol transfers a digital carrier of the second type to a digital carrier of the first type at origination of a digital call corresponding to the second type of digital carrier.

11. A method as recited in claim 7 which includes the further steps of:
   channelizing each of the digital carriers by a repeating frame structure which includes plural time slots with a time slot of one channel of a given digital carrier distinct from a time slot of any other channel of the given digital carrier; and
   synchronizing the frames of the digital carriers so that a channel of the given digital carrier is synchronous with a channel of another digital carrier.

12. In a radio frequency communications system having a plurality of stations, wherein the stations communicate on carrier frequencies using channels assigned from among a plurality of assignable channels, some of the channels having a time division multiple access (TDMA) format of a first type requiring a repeating time slot corresponding to a portion of a carrier frequency and some of the channels having a TDMA format of a second type also requiring a repeating time slot corresponding to a portion of a carrier frequency, a method of reassigning channels among the carrier frequencies comprising:
   examining each of the carrier frequencies supporting TDMA channels to locate those carrier frequencies supporting less than a predetermined number of TDMA channels; and
   reassigning at least one TDMA channel from at least one of the located carrier frequencies to another of the located carrier frequencies in order to reduce the number of carrier frequencies supporting less than the predetermined number of TDMA channels.

13. A method as recited in claim 12, which includes the further step, before the step of examining, of terminating a TDMA channel and wherein the step of examining excludes the TDMA channel just terminated.

14. A method as recited in claim 12, which includes the further step, before the step of examining, of receiving a call attempt and wherein the step of reassigning includes assigning a channel for the call corresponding to the received call attempt in order to minimize the number of carrier frequencies supporting less than the predetermined number of TDMA channels.

15. A method as recited in claim 14 wherein the step of receiving a call attempt includes receiving a call attempt at a central radio station among the plurality of stations, the call attempt being transmitted from a station other than the central radio station to the central radio station.

16. A method as recited in claim 12, which includes the further step, after the step of reassigning at least one TDMA channel, of identifying carrier frequencies which are not supporting any channels and terminating transmission of such identified carrier frequencies.

17. A method as recited in claim 12, wherein the system comprises a cellular telephone system having a hand-off protocol for handing stations off from one cell to another cell and wherein the step of reassigning at least one TDMA channel includes applying the hand-off protocol to hand at least one TDMA channel off from one carrier frequency of a cell to another carrier frequency of the same cell.

18. A method as recited in claim 17 which includes the further step of synchronizing the timing of the repeating time slot of at least one TDMA channel with the timing of the repeating time slots of the other carrier frequency of a cell to another carrier frequency of the same cell to which the channel is handed off.

19. In a radio frequency communications system having a plurality of stations, wherein the stations communicate on carrier frequencies using channels assigned from among a plurality of assignable channels, some of the channels having a time division multiple access (TDMA) format of a first type requiring a repeating time slot corresponding to a portion of a carrier frequency, and some of the channels having a TDMA format of a second type also requiring a repeating time slot corresponding to a portion of a carrier frequency, and wherein the carrier frequencies are assigned to the support of TDMA channels, of either the first type or the second type, a method of assigning a new channel to a carrier frequency comprising:

receiving a call attempt for signaling a requirement to provide an assignment for a new channel;

determining whether the required new channel is of the first type or of the second type;

if the new channel is of the first type, examining the carrier frequencies assigned to TDMA channels of the first type to determine whether a channel is available on the carrier frequencies, so assigned;

if no TDMA channel of the first type is available, examining the carrier frequencies assigned to TDMA channels of the second type to determine whether a channel is available, on the carrier frequency so assigned; and if a TDMA channel of the second type is available, reassigning the available TDMA channel of the second type to TDMA channels of the first type, and assigning the new channel to the reassigned channel.

20. A method as recited in claim 19, wherein the system comprises a cellular telephone system having a plurality of cells and wherein the step of receiving a call attempt includes receiving a request to hand the new channel off from one cell to another cell.

21. A method as recited in claim 20, wherein the cellular telephone system has a hand-off protocol for handing stations off from one cell to another cell and wherein the step of assigning the new channel includes applying the hand-off protocol to hand the new channel off from the one cell to the other cell.

22. A method as recited in claim 19, wherein the TDMA channels comprise digital radio transmission channels.

23. A method as recited in claim 19, wherein the step of receiving a call attempt includes detecting the beginning of a speech spurt for a channel used for telephone voice communications.

24. A method as recited in claim 19, wherein the step of receiving a call attempt includes detecting a data packet for a channel used for packet data communications.

* * * * *